(12) United States Patent
Xu et al.

(10) Patent No.: US 9,897,293 B2
(45) Date of Patent: Feb. 20, 2018

(54) BACKLIGHT MODULE AND DISPLAY DEVICE

(71) Applicant: BOE Technology Group Co., Ltd., Beijing (CN)

(72) Inventors: Jian Xu, Beijing (CN); Xinyin Wu, Beijing (CN); Yongda Ma, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 122 days.

(21) Appl. No.: 14/911,303

(22) PCT Filed: Jun. 26, 2015

(86) PCT No.: PCT/CN2015/082520
§ 371 (c)(1),
(2) Date: Feb. 10, 2016

(87) PCT Pub. No.: WO2016/110066
PCT Pub. Date: Jul. 14, 2016

(65) Prior Publication Data
US 2016/0341404 A1    Nov. 24, 2016

(30) Foreign Application Priority Data

Jan. 8, 2015 (CN) .................... 2015 2 0012935 U

(51) Int. Cl.
*F21V 17/16* (2006.01)
*F21V 21/00* (2006.01)
(Continued)

(52) U.S. Cl.
CPC ............ *F21V 21/00* (2013.01); *F21V 17/164* (2013.01); *G02F 1/133308* (2013.01);
(Continued)

(58) Field of Classification Search
CPC ............ G02F 1/1333; G02F 1/133606; G02F 1/133308; F21V 21/00; F21V 17/164
See application file for complete search history.

(56) References Cited

U.S. PATENT DOCUMENTS 7,956,955 B2 * 6/2011 Huo .................. G02F 1/133606
349/70
2013/0286323 A1 * 10/2013 Kuo ...................... G02F 1/1333
349/58

FOREIGN PATENT DOCUMENTS

CN          101452149 A     6/2009
CN          201654392 U     11/2010
(Continued)

OTHER PUBLICATIONS

International Search Report and Written Opinion for International Application No. PCT/CN2015/082520, dated Oct. 13, 2015, 13 pages.
(Continued)

*Primary Examiner* — Karabi Guharay
(74) *Attorney, Agent, or Firm* — Westman, Champlin & Koehler, P.A.

(57) ABSTRACT

The present disclosure relates to a field of display technology and discloses a backlight module and a display device. The backlight module comprises: a backplate comprising a bottom plate and side plates, which form a mounting recess; an optical film positioned in the mounting recess; at least two supporting bars positioned between the bottom plate and the optical film and arranged crosswise, wherein each two supporting bars are fastened to each other and each of the supporting bars is fastened on the bottom plate. In the above backlight module, a mechanical strength of the backplate of the backlight module may be increased due to the supporting bars mounted on the bottom plate and arranged crosswise, and a resistance to bending of the backplate is thus
(Continued)

improved. Further, as the used supporting bars have a bar-shape structure and are arranged crosswise without covering the overall surface of the backplate, the weight of the backlight module is increased by a smaller amount than the existing backlight module with an increasing strength of the backplate. Thus, the backlight module has a high strength and a light weight.

19 Claims, 5 Drawing Sheets

(51) Int. Cl.
    *G02F 1/1333*     (2006.01)
    *G02F 1/1335*     (2006.01)
(52) U.S. Cl.
    CPC ............... *G02F 1/133608* (2013.01); *G02F 2001/133314* (2013.01); *G02F 2201/465* (2013.01)

(56) References Cited

FOREIGN PATENT DOCUMENTS

| | | |
|---|---|---|
| CN | 102734763 A | 10/2012 |
| CN | 102798093 A | 11/2012 |
| CN | 204300864 U | 4/2015 |
| JP | 2000-275445 A | 10/2000 |

OTHER PUBLICATIONS

English translation of Box No. V from the Written Opinion of the International Searching Authority for International Application No. PCT/CN2015/082520, 2 pages.

\* cited by examiner

BACKLIGHT MODULE AND DISPLAY DEVICE

CROSS-REFERENCE TO RELATED APPLICATION

This application is a Section 371 National Stage application of International Application No. PCT/CN2015/082520, filed on Jun. 26, 2015, entitled "A BACKLIGHT MODULE AND DISPLAY DEVICE, which has not yet published, which claims priority to Chinese Patent Application No. 201520012935.1 filed on Jan. 8, 2015, incorporated by reference in their entirety.

BACKGROUND OF THE INVENTION

Field of the Invention

The present disclosure relates to a field of display technology, in particular, to a backlight module and a display device.

Description of the Related Art

A large-size backlight module or an ultra-thin backlight module has a poor strength and thus is easy to be twistedly deformed. In order to address this problem, a common means is to increase a thickness of a backplate or add a piece of metal sheet onto the backplate to increase the strength thereof.

The above means generally cause the weight of the backlight module to be greatly increased, so that a display device using the backlight module is too heavy and is not easy to be assembled.

SUMMARY OF THE INVENTION

Embodiments of the present invention provide a backlight module and a display device, in which the backlight module has a high strength and a light weight.

In order to achieve the above objects, the present disclosure provides the following solutions.

A backlight module comprising:

a backplate comprising a bottom plate and side plates, which form a mounting recess;

an optical film positioned in the mounting recess;

at least two supporting bars positioned between the bottom plate and the optical film and arranged crosswise;

wherein each two supporting bars arranged crosswise are fastened to each other and each of the supporting bars is fastened on the bottom plate.

In the above backlight module, a mechanical strength of the backplate of the backlight module may be increased due to the supporting bars mounted on the bottom plate and arranged crosswise, and a resistance to bending of the backplate is thus improved. Further, as the used supporting bars have a bar-shape structure and are arranged crosswise without covering the overall surface of the backplate, the weight of the backlight module is increased by a smaller amount than the existing backlight module with an increasing strength of the backplate. Thus, the above backlight module has a high strength and a light weight.

Preferably, at least one end of at least one supporting bar is provided with a stepped boss raised away from the bottom plate, and the stepped boss is formed with a supporting surface for display panel, for supporting and positioning a display panel.

Preferably, the stepped boss is further formed with a supporting surface for optical film, for supporting and positioning the optical film.

Preferably, the backlight module further comprises a fastening piece which has a pressing surface for display panel, for pressing the display panel against the supporting surface for display panel.

Preferably, the fastening piece engages with the stepped boss in a snap-fit manner.

Preferably, the stepped boss has a projected part formed on a top thereof, the fastening piece has a groove formed in a surface thereof facing towards the bottom plate, and the projected part engages with the groove in a snap-fit manner.

Preferably, the projected part has snapping members provided on sidewalls thereof; the groove has hooks corresponding to the respective snapping members, provided on inner sidewalls thereof, and each snapping member engages with the corresponding hook in a snap-fit manner.

Preferably, the bottom plate is in a quadrilateral shape and has a first corner, a second corner, a third corner and a fourth corner which are adjacent in sequence, and there are two supporting bars;

an end of one supporting bar of the two supporting bars is fastened to the first corner of the bottom plate and the other end thereof is fastened to the third corner of the bottom plate; and an end of the other supporting bar of the two supporting bars is fastened to the second corner of the bottom plate and the other end thereof is fastened to the fourth corner of the bottom plate.

Preferably, the two supporting bars are formed as an integrated structure.

Preferably, there are three supporting bars, one of which intersects with the other two supporting bars, respectively, and two ends of each of the supporting bars abut against two side plates of the bottom plate, respectively.

Preferably, there are three supporting bars including a first supporting bar, a second supporting bar and a third supporting bar, and the first supporting bar perpendicularly intersects with the second supporting bar and the third supporting bar, respectively.

Preferably, intersecting portions of the first supporting bar with the second supporting bar and the third supporting bar are provided with slots respectively, in which an intersecting portion of the second supporting bar and an intersecting portion of the third supporting bar are positioned, respectively; and the first supporting bar is fastened to the second supporting bar and the third supporting bar with respective screws.

Preferably, a side of the supporting bar facing away from the bottom plate is provided with reinforcing ribs.

Preferably, a central portion of each supporting bar is fixed onto the backplate.

An embodiment of the present invention further provides a display device comprising the backlight module according to any one of the above solutions.

DETAILED DESCRIPTION OF PREFERRED EMBODIMENTS OF THE INVENTION

Next, the technical solutions in embodiments of the present invention will be described clearly and completely in combination with the drawings. It is obvious that the described embodiments are merely a part of embodiments of the present invention, rather than all of them. All other embodiments obtained by those skilled in the art without any creative work on a basis of the embodiments of the present invention belong to the scope of the present invention.

Figure 1:
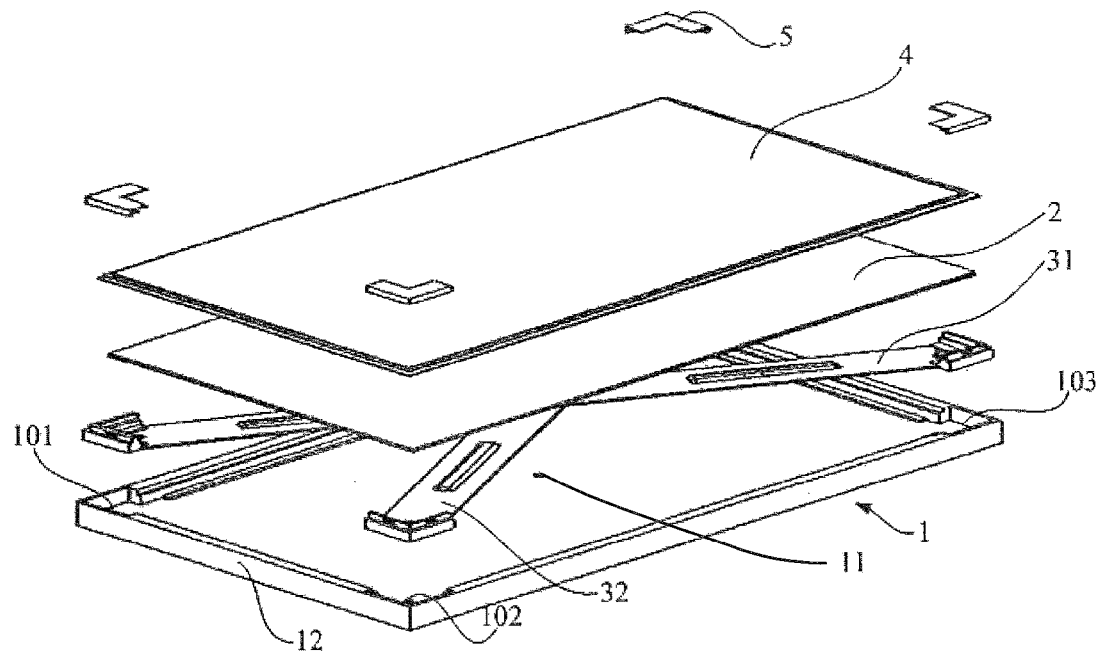
FIG. 1 is an exploded structural schematic view of a backlight module according to an embodiment of the present invention.
Figure 2:
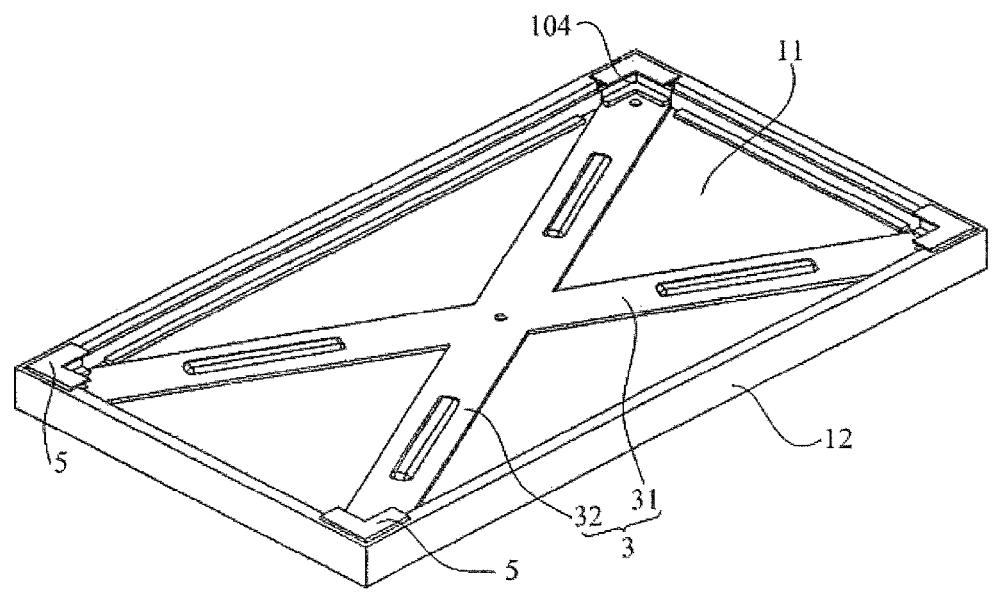
FIG. 2 is a structural schematic view of a backlight module according to an embodiment of the present invention.
Figure 3:
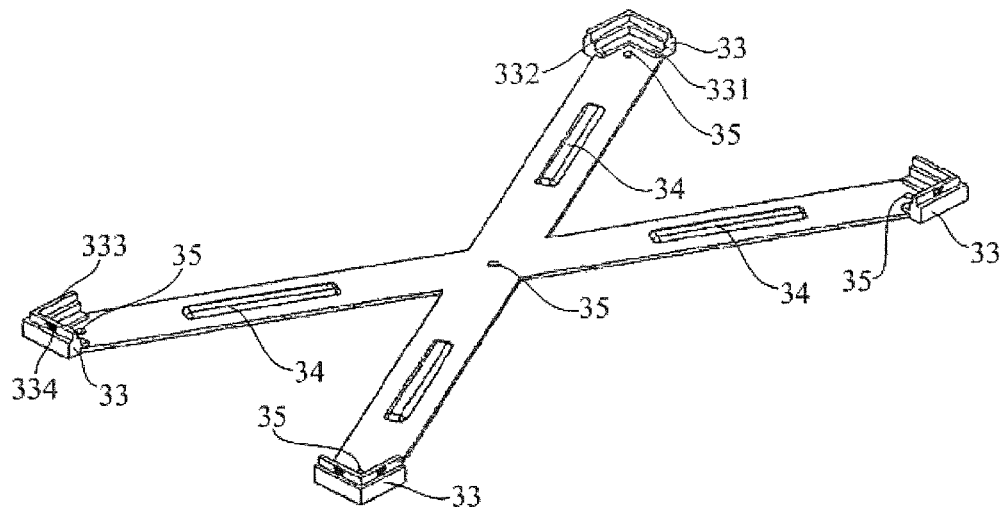
FIG. 3 is a structural schematic view of a supporting bar in the backlight module of FIG. 1.
Figure 4:
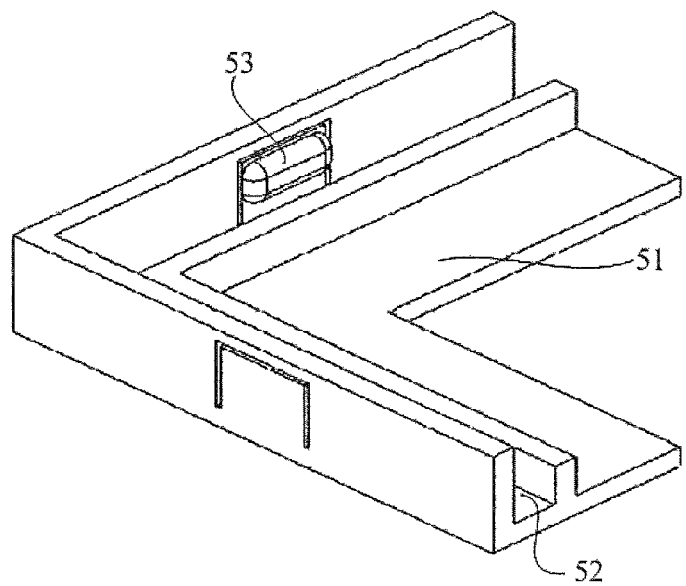
FIG. 4 is a structural schematic view of a fastening piece in the backlight module of FIG. 1.
Figure 5:
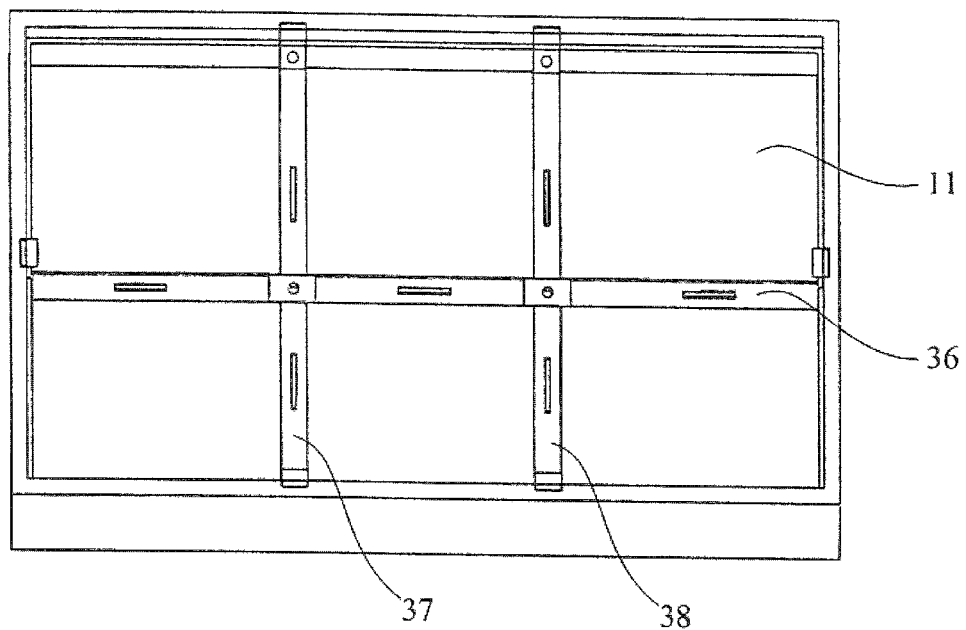
FIG. 5 is a structural schematic view of a backlight module according to an embodiment of the present invention.

Referring to FIGS. 1, 2, 3, 4 and 5, as shown in FIGS. 1, 2 and 5, an embodiment of the present invention provides a backlight module comprising: a backplate 1 comprising a bottom plate 11 and side plates 12 which form a mounting recess; an optical film 2 mounted in the mounting recess; and at least two supporting bars 3 positioned between the bottom plate 11 and the optical film 2 and arranged crosswise. Each two supporting bars 3 are fastened to each other and each supporting bar 3 is fastened on the bottom plate 11.

In the above backlight module, a mechanical strength of the backplate 1 of the backlight module may be increased due to the supporting bars 3 mounted on the bottom plate 11 and arranged crosswise, and a resistance to bending of the backplate 1 is thus improved. Further, as the used supporting bars 3 have a bar-shape structure and are arranged crosswise without covering the overall surface of the backplate 1, the weight of the backlight module is increased by a smaller amount than the existing backlight module with an increasing strength of the backplate. Thus, the above backlight module has a high strength and a light weight.

As shown in FIGS. 1 and 2, in a preferred embodiment, there are two supporting bars including a supporting bar 31 and a supporting bar 32. The bottom plate 11 of the backplate 1 is in a quadrilateral shape, the bottom plate 11 and four side plates 12 of the backplate 1 form four corners, that is, a first corner 101, a second corner 102, a third corner 103 and a fourth corner 104. As shown in FIGS. 1 and 2, two ends of the supporting bar 31 are mounted to the first corner 101 and the third corner 103 of the backplate 1, respectively; and two ends of the supporting bar 32 are mounted to the second corner 102 and the fourth corner 104, respectively.

As two supporting bars 3 are arranged crosswise and the ends of the supporting bars 3 are mounted to the corners of the backplate 1, the backplate 1 is separated into four triangular areas by the supporting bars 3. As a result of the stability of the triangle, the backplate 1 may be supported by the supporting bars 3 excellently and the strength thereof is thus greatly increased.

In a preferred embodiment based on the above embodiment, the supporting bars 31, 32 are formed as an integrated cross structure, such that the two supporting bars 3 are fixed to each other and the structure of the supporting bars 3 may have an increased stability and reliability.

As shown in FIGS. 1 and 3, in a particular embodiment based on the above embodiments, at least one end of at least one supporting bar 3 is provided with a stepped boss 33 raised away from the bottom plate 11. The stepped boss 33 is formed with a supporting surface 332 for display panel, for supporting and positioning a display panel 4. In a preferred embodiment, the stepped boss 33 is further formed with a supporting surface 331 for optical film, for supporting and positioning the optical film 2.

Preferably, both ends of each supporting bar 3 are provided with the stepped bosses, and four stepped bosses 33 provided by the two supporting bars 3 are positioned at four corners of the backplate 1, respectively. The supporting surfaces 331 for optical film and the supporting surfaces 332 for display panel formed on the stepped bosses 33 can support and position the four corners of the optical film 2 and that of the display panel 4, respectively. The stabilities of the optical film 2 and the display panel 4 may thus be increased.

As shown in FIGS. 1, 2 and 4, in a particular embodiment based on the above embodiments, the backlight module further comprises a fastening piece 5 which has a pressing surface 51 for display panel, for pressing the display panel 4 onto the supporting surface 332 for display panel. The fastening piece 5 engages with the stepped boss 33 in a snap-fit manner. Because of the snap-fit between the fastening piece 5 and the stepped boss 33, the display panel 4 and the backlight module are possible to be assembled together, so that a stable display device may be formed.

As shown in FIGS. 3 and 4, in a preferred embodiment, the snap-fit between the fastening piece 5 and the stepped boss 33 may be performed as follows: a projected part 333 is formed on the top of the stepped boss 33, a groove 52 is formed in a surface of the fastening piece 5 facing towards the bottom plate 11, and the projected part 333 engages with the groove 52 in a snap-fit manner. As shown in FIGS. 3 and 4, preferably, sidewalls of the projected part 333 are provided with snapping members 334, inner sidewalls of the groove 52 are provided with hooks 53 corresponding to the respective snapping members 334, and each pair of snap 334 and hook 53 are snapped together.

Of course, the snap-fit between the fastening piece 5 and the stepped boss 33 may also be performed with other means.

As shown in FIGS. 1, 2 and 3, in a particular embodiment based on the above embodiments, reinforcing ribs 34 are provided at a side of the supporting bar 3 facing away from the bottom plate 11 so as to increase the strength of the supporting bar 3.

In a particular embodiment based on the above embodiments, the central portion of each of the supporting bars 3 is fixed onto the backplate 1. As shown in FIGS. 2 and 3, preferably, a center of the intersecting portion of the supporting bars 3 is a center of each of the supporting bars 3. Both two ends of the supporting bar 3 and the center of the intersecting portion of the supporting bars 3 are provided with screw holes 35. With screws engaging with the screw holes 35, the center of the intersecting portion of the supporting bars 3 can be fastened onto the bottom plate 11 and two ends of the supporting bar 3 can be fastened onto the corners of the backplate 1.

Of course, the supporting bar 3 may also be fastened onto the backplate 1 with other means.

Figure 6:
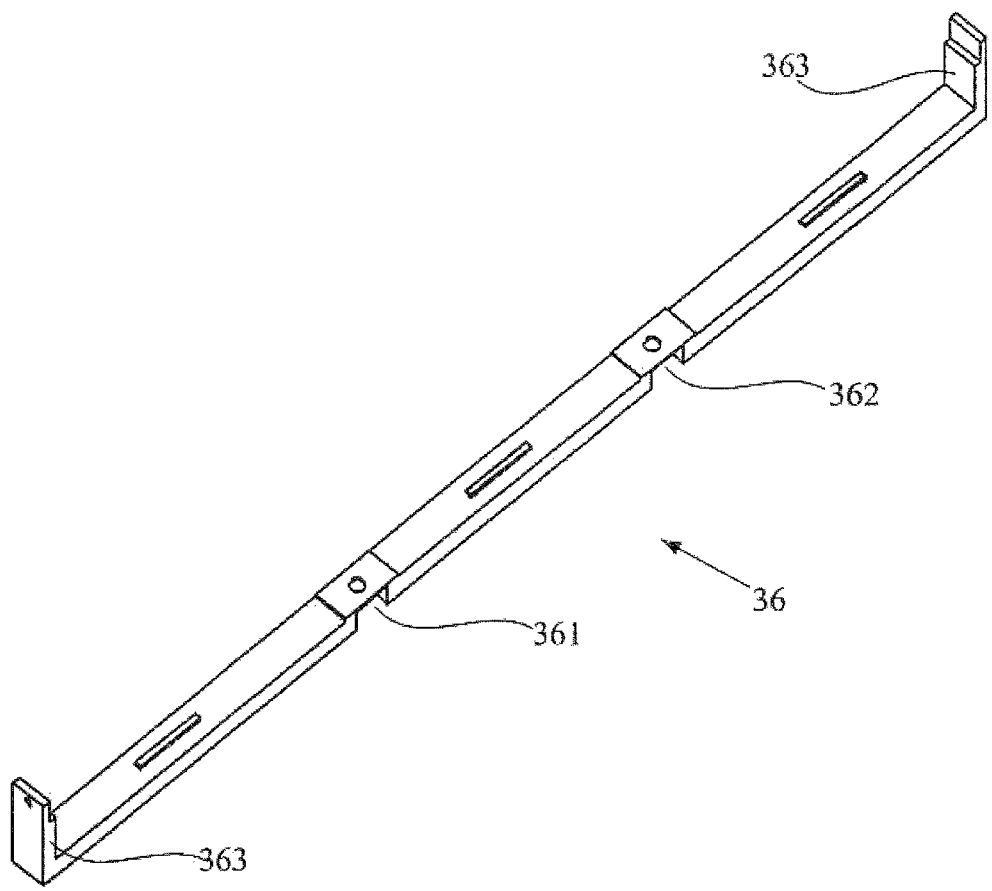
FIG. 6 is a structural schematic view of a supporting bar in the backlight module of FIG. 5.
Figure 7:
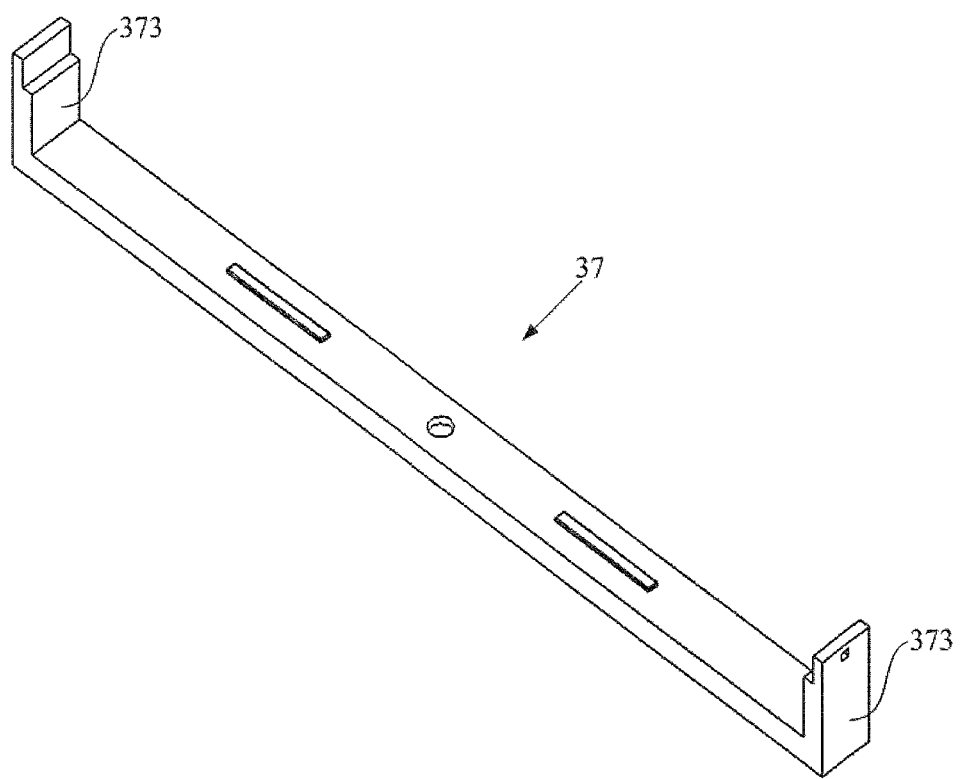
FIG. 7 is a structural schematic view of a supporting bar in the backlight module of FIG. 5.

In a particular embodiment, there are three supporting bars 3, one of which intersects with the other two supporting bars, respectively. Two ends of each of the supporting bars abut against two side plates of the bottom plate. As shown in FIGS. 5, 6 and 7, the three supporting bars include a supporting bar 36, a supporting bar 37 and a supporting bar 38. The supporting bar 36 perpendicularly intersects with the supporting bar 37 and the supporting bar 38, respectively. The bottom plate 11 of the backplate 1 is in a parallelogram shape. The supporting bar 36 is parallel to a long side of the parallelogram, and two ends thereof abut against the side plates corresponding to short sides of the parallelogram, respectively. The supporting bar 37 is parallel to a short side of the parallelogram, and two ends thereof abut against the side plates corresponding to long sides of the parallelogram, respectively. The supporting bar 38 is parallel to a short side of the parallelogram, and two ends thereof abut against the side plates corresponding to long sides of the parallelogram, respectively.

In a preferred embodiment, as shown in FIGS. 5, 6 and 7, at least one end of at least one of the three supporting bars 3 is provided with a stepped boss raised away from the bottom plate 11. The stepped boss may be formed with a supporting surface for display panel, for supporting and positioning the display panel 4. As shown in FIG. 6, two ends of the supporting bar 36 are formed with two stepped bosses 363. As shown in FIG. 7, two ends of the supporting bar 37 are formed with two stepped bosses 373. The supporting bar 38 may have the totally same structure as the supporting bar 37.

In a preferred embodiment, the supporting bar 36 perpendicularly intersects with the supporting bar 37 and the supporting bar 38, respectively. Specifically, as shown in FIGS. 5, 6 and 7, a slot 361 is provided in a portion of the supporting bar 36 corresponding to the intersecting portion of the supporting bar 37, the intersecting portion of the supporting bar 37 is positioned in the slot 361 of the supporting bar 36 so as to realize an intersection with the supporting bar 36, and the supporting bar 37 and the supporting bar 36 are fastened with a screw. A slot 362 is provided in a portion of the supporting bar 36 corresponding to the intersecting portion of the supporting bar 38, the intersecting portion of the supporting bar 38 is positioned in the slot 362 of the supporting bar 36 so as to realize an intersection with the supporting bar 36, and the supporting bar 38 and the supporting bar 36 are fastened with a screw.

An embodiment of the present invention further provides a display device comprising the backlight module according to any one of the above embodiments. The display device has a good resistance to deformation and a light weight.

It is obvious that various changes and modifications can be made to these embodiments by those skilled in the art without departing from the spirit and scope of the present invention. As such, these changes and modifications are also intended to be included in the present invention if they fall into the scope of appended claims and equivalents thereof.

What is claimed is:

1. A backlight module comprising:
    a backplate comprising a bottom plate and side plates, which form a mounting recess;
    an optical film positioned in the mounting recess;
    at least two supporting bars positioned between the bottom plate and the optical film and arranged crosswise;
    wherein each two supporting bars arranged crosswise are fastened to each other and each of the supporting bars is fastened on the bottom plate; and
    wherein at least one end of at least one supporting bar is provided with a stepped boss raised away from the bottom plate, and the stepped boss is formed with a supporting surface for display panel, for supporting and positioning a display panel.

2. The backlight module according to claim 1, wherein the stepped boss is further formed with a supporting surface for optical film, for supporting and positioning the optical film.

3. The backlight module according to claim 2, further comprising a fastening piece which has a pressing surface for display panel, for pressing the display panel against the supporting surface for display panel.

4. The backlight module according to claim 3, wherein the fastening piece engages with the stepped boss in a snap-fit manner.

5. The backlight module according to claim 4, wherein,
    the stepped boss has a projected part formed on a top thereof;
    the fastening piece has a groove formed in a surface thereof facing towards the bottom plate, and
    the projected part engages with the groove in a snap-fit manner.

6. The backlight module according to claim 5 wherein,
    the projected part has snapping members provided on sidewalls thereof;
    the groove has hooks corresponding to the respective snapping members, provided on inner sidewalls thereof, and
    each snapping member engages with the corresponding hook in a snap-fit manner.

7. The backlight module according to claim 1, wherein the bottom plate is in a quadrilateral shape and has a first corner, a second corner, a third corner and a fourth corner which are adjacent in sequence, and there are two supporting bars; and
    wherein an end of one supporting bar of the two supporting bars is fastened to the first corner of the bottom plate and the other end thereof is fastened to the third corner of the bottom plate; and
    an end of the other supporting bar of the two supporting bars is fastened to the second corner of the bottom plate and the other end thereof is fastened to the fourth corner of the bottom plate.

8. The backlight module according to claim 7, wherein the two supporting bars are formed as an integrated structure.

9. The backlight module according to claim 1, wherein there are three supporting bars, one of which intersects with the other two supporting bars, respectively, and two ends of each of the supporting bars abut against two side plates of the bottom plate, respectively.

10. The backlight module according to claim 1, wherein there are three supporting bars including a first supporting bar, a second supporting bar and a third supporting bar, and the first supporting bar perpendicularly intersects with the second supporting bar and the third supporting bar, respectively.

11. The backlight module according to claim 10, wherein intersecting portions of the first supporting bar with the second supporting bar and the third supporting bar are provided with slots respectively, in which an intersecting portion of the second supporting bar and an intersecting portion of the third supporting bar are positioned, respectively; and the first supporting bar is fastened to the second supporting bar and the third supporting bar with respective screws.

12. The backlight module according to claim 1, wherein a side of the supporting bar facing away from the bottom plate is provided with reinforcing ribs.

13. The backlight module according to claim 1, wherein a central portion of each supporting bar is fixed onto the backplate.

14. A display device comprising the backlight module according to claim 1.

15. The backlight module according to claim 1, further comprising a fastening piece which has a pressing surface for display panel, for pressing the display panel against the supporting surface for display panel.

16. The backlight module according to claim 15, wherein the fastening piece engages with the stepped boss in a snap-fit manner.

17. The backlight module according to claim 16, wherein,
the stepped boss has a projected part formed on a top thereof;
the fastening piece has a groove formed in a surface thereof facing towards the bottom plate, and
the projected part engages with the groove in a snap-fit manner.

18. The backlight module according to claim 17, wherein,
the projected part has snapping members provided on sidewalls thereof;
the groove has hooks corresponding to the respective snapping members, provided on inner sidewalls thereof, and
each snapping member engages with the corresponding hook in a snap-fit manner.

19. The backlight module according to claim 16, wherein,
the projected part has snapping members provided on sidewalls thereof;
the groove has hooks corresponding to the respective snapping members, provided on inner sidewalls thereof, and
each snapping member engages with the corresponding hook in a snap-fit manner.

* * * * *